US011900559B1

(12) United States Patent
Li et al.

(10) Patent No.: US 11,900,559 B1
(45) Date of Patent: Feb. 13, 2024

(54) VIRTUAL SHOE TRY-ON

(71) Applicant: Amazon Technologies, Inc., Seattle, WA (US)

(72) Inventors: Yuelong Li, Santa Clara, CA (US); Sunil Sharadchandra Hadap, Dublin, CA (US); Miriam Bellver Bueno, Barcelona (ES)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 17/706,213

(22) Filed: Mar. 28, 2022

(51) Int. Cl.
*G06T 19/20* (2011.01)
*G06T 7/20* (2017.01)
*G06T 5/00* (2006.01)
*G06T 5/50* (2006.01)
*G06T 7/73* (2017.01)

(52) U.S. Cl.
CPC ............. *G06T 19/20* (2013.01); *G06T 5/002* (2013.01); *G06T 5/50* (2013.01); *G06T 7/20* (2013.01); *G06T 7/75* (2017.01); *G06T 2207/20132* (2013.01); *G06T 2207/20221* (2013.01); *G06T 2219/2004* (2013.01); *G06T 2219/2016* (2013.01)

(58) Field of Classification Search
CPC ........... G06T 19/20; G06T 7/75; G06T 5/002; G06T 5/50; G06T 7/20; G06T 2207/20132; G06T 2207/20221; G06T 2219/2004; G06T 2219/2016
See application file for complete search history.

(56) References Cited

U.S. PATENT DOCUMENTS

| 2017/0032579 A1* | 2/2017 | Eisemann | G06T 17/205 |
| 2020/0320769 A1* | 10/2020 | Chen | G06F 18/214 |
| 2023/0230332 A1* | 7/2023 | Stoddart | G06T 7/50 |
| | | | 345/419 |

OTHER PUBLICATIONS

Chou, Chao-Te, et al. "Pivtons: Pose invariant virtual try-on shoe with conditional image completion." Computer Vision—ACCV 2018: 14th Asian Conference on Computer Vision, Perth, Australia, Dec. 2-6, 2018, Revised Selected Papers, Part VI 14. Springer International Publishing, 2019. (Year: 2019).*
An, Shan, et al. "ARShoe: Real-time augmented reality shoe try-on system on smartphones." Proceedings of the 29th ACM International Conference on Multimedia. 2021. (Year: 2021).*

* cited by examiner

*Primary Examiner* — Yu Chen
(74) *Attorney, Agent, or Firm* — K&L Gates LLP

(57) ABSTRACT

According to an embodiment, a method includes estimating, based at least in part on a first location of a bounding box for a foot in a first frame of a sequence of frames and a second location of the bounding box in a second frame of the sequence of frames, a smoothing transformation that characterizes a movement of the foot in the sequence of frames and smoothing, based at least in part on the smoothing transformation, a movement of a structure of the foot from a first location of the structure in the first frame to a second location of the structure in the second frame. The method also includes superimposing a model of a shoe onto the foot in the sequence of frames based at least in part on the smoothed movement.

20 Claims, 12 Drawing Sheets

VIRTUAL SHOE TRY-ON

BACKGROUND

The present disclosure relates to shoes, and more specifically, to fitting shoes on a person's feet. One challenge of purchasing shoes online is that a user may not have the opportunity to test the shoes on the user's feet before purchasing, and thus, it may be difficult to find shoes that are a good fit on the user's feet.

DETAILED DESCRIPTION

Figure 1:
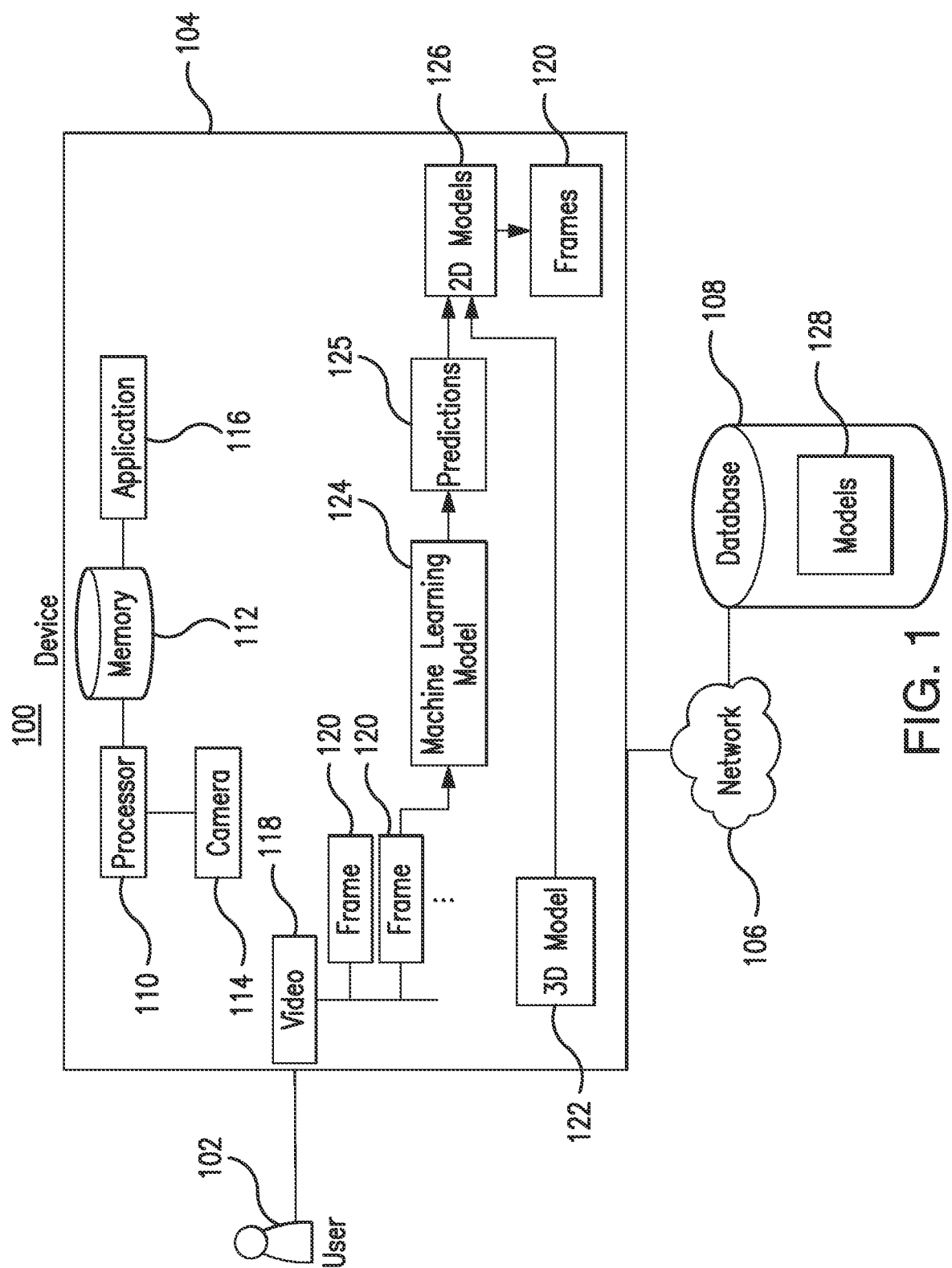
FIG. 1 illustrates an example system.

The present disclosure describes a virtual shoe try-on feature that allows a user to see how a shoe will look on the user's foot before the user purchases the shoe. The virtual shoe try-on feature uses machine learning to predict how a shoe will fit onto a video of the user's foot. The feature then generates and superimposes two-dimensional (2D) models of the shoe onto frames of the video to show the user how the shoe will look on the user's foot. In this manner, the user may see the shoe superimposed onto the user's foot in a video concurrently captured by the user's mobile device.

Several different types of predictions are made to generate the 2D model for each frame. For example, for each frame, a bounding box for the foot may be predicted and the frame may be cropped according to that bounding box to remove extraneous information from the frame. The orientation of the foot and the locations of key structures on the foot (e.g., toes, ankle, heel, etc.) are also predicted. Furthermore, the locations on the foot that will be occluded by other objects in the frame (e.g., the user's leg or apparel) are predicted.

These predictions are used to generate a 2D model of a desired shoe from a 3D model of the shoe that was retrieved from a database. For example, the predictions for the frame may be used to rotate or orient the 3D model of the shoe to align with the foot in the frame. Additionally, the predictions may be used to scale or resize the 3D model of the shoe to fit on the foot in the frame. Moreover, the predictions may be used to remove or exclude portions of the 3D model of the shoe that will be occluded by other objects in the frame when positioned in the frame. The 3D model is flattened to generate the 2D model of the shoe. The 2D model is then superimposed onto the foot in the frame to simulate the look and fit of the shoe on the foot.

A challenge that arises when generating the 2D models for the different frames of the video is that the predictions may be generated independently across frames and thus, the predictions may vary across the frames even though the frames are captured sequentially and the position of the foot in the frames does not significantly change. Stated differently, if the predictions for a frame are generated independently from the predictions for other frames, then there may be inconsistencies in predictions for different frames. As a result, the user may observe the 2D model of the shoe changing position, orientation, or size over time even though the user's foot in the video is not changing position, orientation, or size. This degrades the user experience and the simulation of the look and fit of the shoe on the user's foot.

The present disclosure describes a process for smoothing the predictions across frames of the video using the predictions generated for other frames of the video. The smoothing process begins by tracking the location of the bounding boxes for the foot across frames of the video and the movement of certain pixels across frames. A 2D affine transformation that characterizes the movement of the bounding box across frames and the pixels across frames is generated. The 2D affine transformation is then used to smooth the predictions. For example, an extended Kalman filter for 3D rigid tracking may use the 2D affine transformation as a motion cue. The locations of key structures on the foot and the orientation of the foot across frames are then smoothed by the Kalman filter predictions. The 2D model of the shoe is then generated from the 3D model of the shoe using these smoothed predictions. In this manner, the user observes a more accurate simulation of the look and fit of the shoe on the user's foot, in certain embodiments.

FIG. 1 illustrates an example system 100. As seen in FIG. 1, the system 100 includes a device 104, a network 106, and a database 108. The system 100 implements a virtual shoe try-on feature that simulates the look and fit of a shoe on a user's 102 foot during the online shopping process. The user 102 may use the device 104 to see how the shoe looks and fits on the user's 102 foot before purchasing the shoe. In certain embodiments, the system 100 improves the likelihood that the user 102 purchases a shoe that fits properly on the user's 102 foot, which improves user satisfaction and reduces waste associated with returns.

The device 104 may be a personal device of the user 102, such as, for example, a mobile phone or a laptop of the user 102. The user 102 uses the device 104 to shop for shoes online. When the user 102 finds a pair of shoes that the user 102 likes, the user 102 may use the virtual shoe try-on feature implemented by the device 104 to simulate the look and fit of the shoe on the user's 102 foot. As see in FIG. 1, the device 104 includes a processor 110, memory 112, and camera 114 that perform the actions and functions of the device 104.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the database 108, network 106, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application 116 executable by the processor 110 to perform one or more of the functions described herein.

The device 104 executes the application 116 to implement one or more features of the device 104. For example, the application 116 may be a shopping application that the user 102 uses to shop for shoes online. The application 116 may also perform the virtual shoe try-on feature when instructed by the user 102. In some embodiments, the memory 112 stores the application 116, and the processor 110 executes the application 116 to perform one or more of the features or functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 stores one or more models 128 of shoes that are available for purchase. In some embodiments, the database 108 stores three-dimensional (3D) models 128 of shoes. When the user 102 uses the device 104 to indicate that the user 102 would like to virtually try on a shoe, the device 104 communicates a query to the database 108 to retrieve the model for that shoe. When the database 108 receives the query, the database 108 retrieves the model of the desired shoe and communicates that model to the device 104 over the network 106. The device 104 may then process that model to simulate the look and fit of the shoe on the user's 102 foot.

The user 102 uses the camera 114 of the device 104 to capture a video 118 of the user's 102 foot. For example, the user 102 may instruct the device 104 to execute the virtual shoe try-on feature. In response, the device 104 may instruct the user 102 to direct the camera 114 at the user's 102 foot. The device 104 then uses the camera 114 to capture the video 118 of the user's 102 foot. The user 102 may be wearing a shoe or a sock on the foot, or the foot may be unclothed. The video 118 includes a sequence of frames 120. Each frame 120 may be an image of the user's 102 foot. When the frames 120 are displayed in sequence, the user 102 may perceive or view the video 118. As the user 102 moves the device 104 or the user's 102 foot, the location of the foot in certain frames 120 may change.

When the user 102 instructs the device 104 to execute the virtual shoe try-on feature, the device 104 may retrieve a 3D model 122 of a desired shoe from the database 108. For example, the device 104 may communicate a query to the database 108. The query may include an identifier for the shoe that the user 102 desires. The database 108 returns the 3D model 122 in response to the query. The device 104 may then generate predictions and operate on the 3D model 122, to generate 2D models for the frames 120 in the video 118.

The device 104 uses machine learning to predict various aspects of the user's 102 foot, so that the device 104 may generate 2D models 126 of a shoe that fit over the user's 102 foot in the frames 120. For example, the device 104 may apply the machine learning model 124 to the frames 120 to predict bounding boxes for the user's 102 foot in the frames 120. In some embodiments, the device 104 crops the frames 120 according to the bounding boxes for the frames 120 to remove extraneous information from the frames 120. The device 104 then uses the locations of the bounding boxes in the frames 120 to estimate a 2D affine transformation that characterizes the movement of the bounding box across the frames 120. The movement of the bounding box may approximate the movement of the foot in the video 118.

The device 104 also applies the machine learning model 124 to the video 118 to make various predictions 125 about certain aspects of the user's 102 foot in the video 118. For example, the device 104 may apply the machine learning model 124 to predict an orientation of the user's 102 foot in each frame 120. The predicted orientation may indicate an alignment or direction that the user's 102 foot is pointed in a frame 120. As another example, the device 104 may apply the machine learning model 124 to predict the locations of key structures on the user's 102 foot in the frames 120. The keypoint structures may include any structures on the user's 102 foot (e.g., the toes, the heel, or the ankle). The predictions 125 may include coordinates that indicate the locations of these key structures. As yet another example, the device 104 may apply the machine learning model 124 to predict the locations of portions of the user's 102 foot that are occluded by other objects in the video 118 (e.g., the user's 102 leg or pants). The device 104 may use the locations of the occluded portions of the user's 102 foot to determine the portions of the model of the shoe to remove.

The device 104 may use the 2D affine transformation to smooth one or more of these predictions across the sequence of frames. For example, the device 104 may use the 2D affine transformation to smooth the predicted locations of the key structures on the user's 102 foot across the sequence of frames 120. As yet another example, the device 104 may use the 2D affine transformation to smooth the predicted orientations of the food across the sequence of frames 120. In certain embodiments, by smoothing these predictions across the sequence of frames 120, the amount of jitter in these predictions between frames 120 is reduced. By reducing the jitter in these predictions, the amount of jitter in the placement of the model of the shoe over the user's 102 foot across the frames 120 is also reduced. As a result, the user experience is improved and the accuracy of the simulated look and fit of the shoe on the user's 102 foot is improved.

After smoothing the predictions, the device 104 generates one or more 2D models 126 of the shoe from the 3D model 122 of the shoe. The device 104 may use one or more of the predicted aspects of the user's 102 foot in the frames 120 to generate the 2D models 126 of the shoe. For example, for a certain frame 120, the device 104 may rotate the 3D model 122 of the shoe until the 3D model 122 of the shoe aligns with the smoothed orientation of the user's 102 foot in the frame 120. Additionally, the device 104 may resize or rescale the 3D model 122 of the shoe so that the 3D model 122 of the shoe fits appropriately over the key structures on the user's 102 foot in the frame 120. The device 104 may also use the predicted locations of occluded portions of the user's 102 foot in the frame 120 to remove, from the 3D model 122 of the shoe, portions of the 3D model 122 of the shoe that will be occluded by other objects in the video 118. The device 104 then flattens the 3D model 122 of the shoe to generate the 2D model 126 of the shoe for the frame 120. As a result, the 2D model 126 of the shoe may be a projection of the 3D model 122 of the shoe onto a 2D plane. This process may be repeated for each frame 120 of the video 118.

The device 104 then superimposes the 2D models 126 of the shoe onto their respective frames 120 to simulate the look and fit of the shoe on the user's 102 foot. For example, the device 104 may use the predicted location of key structures of the user's 102 foot in the frame 120 to position the 2D model 126 of the shoe over the user's 102 foot in the frame 120. Because the model is aligned with the user's 102 foot in the frame 120 and because the model is scaled to fit appropriately over the user's 102 foot in the frame 120, the device 104 simulates the look and fit of the shoe on the user's 102 foot when the 2D model 126 is superimposed onto the user's 102 foot in the frame 120.

Figure 2:
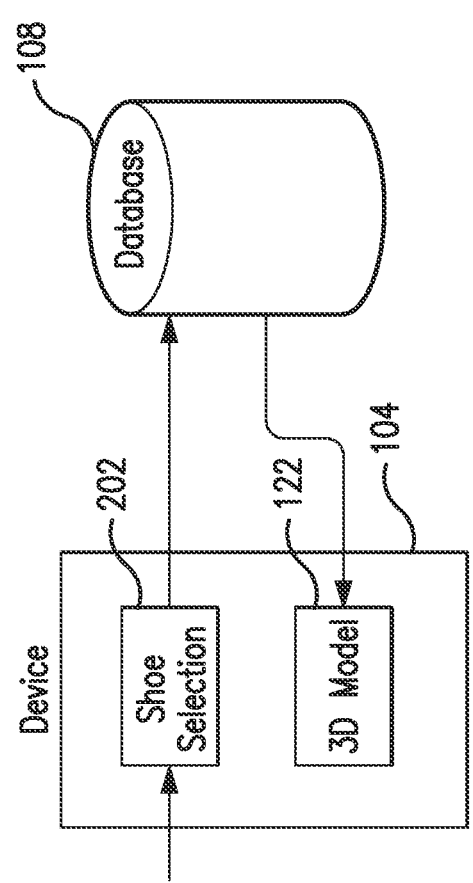
FIG. 2 illustrates an example device and database in the system of FIG. 1.

FIG. 2 illustrates an example device 104 and database 108 in the system 100 of FIG. 1. As seen in FIG. 2, the device 104 receives a shoe selection 202. For example, the device 104 may receive the shoe selection 202 when the user 102 selects a shoe that the user 102 wants to virtually try on. The device 104 may communicate the shoe selection 202 to the database 108. In some embodiments, the shoe selection 202 includes an identifier for the shoe that the user 102 desires. For example, the shoe selection 202 may include a name or model number of the desired shoe. The device 104 may communicate the shoe selection 202 to the database 108 as a query.

The database 108 uses the shoe selection 202 to query information stored in the database 108. Using the information in the shoe selection 202, the database 108 retrieves the 3D model 122 of the desired shoe, and communicates the 3D model 122 of the desired shoe to the device 104. The device 104 then processes the 3D model 122 of the shoe to simulate the look and fit of the shoe on the user's 102 foot.

Figure 3:
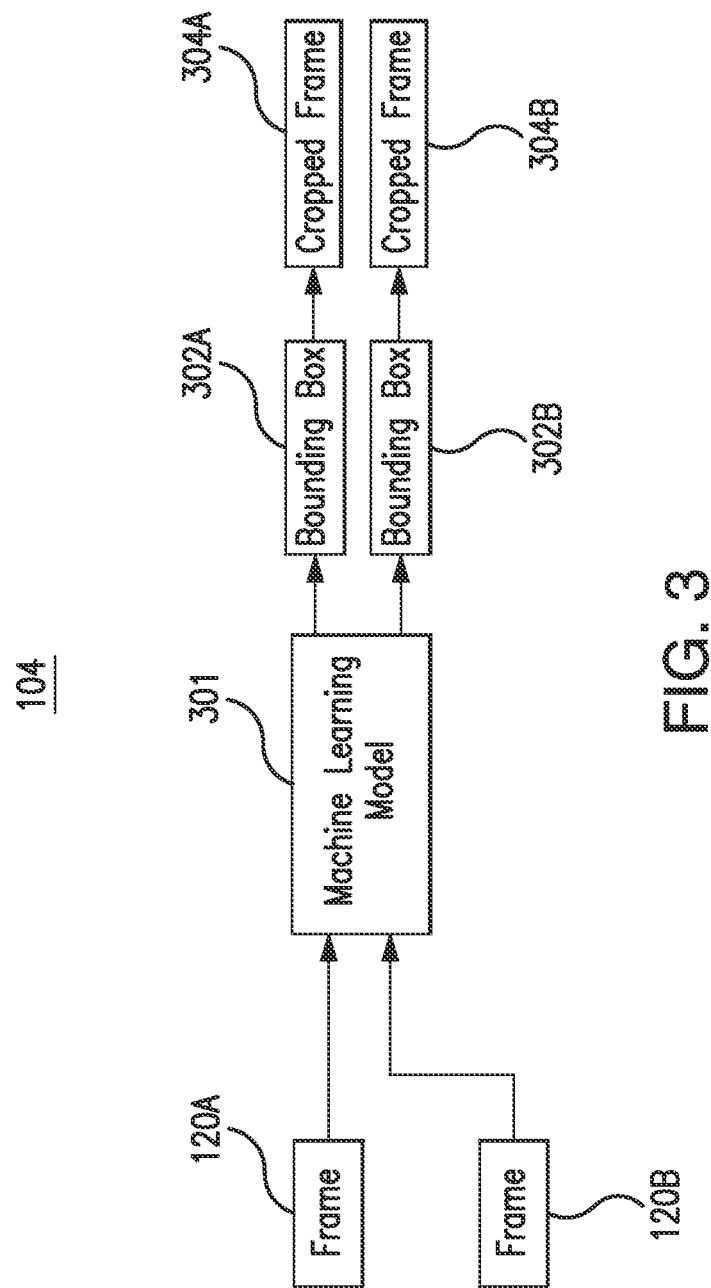
FIG. 3 illustrates an example device in the system of FIG. 1.

FIG. 3 illustrates an example device 104 in the system 100 of FIG. 1. As seen in FIG. 3, the device 104 uses a machine learning model 301 to predict bounding boxes 302 for the frames 120. For example, the device 104 may apply the machine learning model 301 to the frames 120A and 120B to identify the boundaries or location of a foot in the frames 120A and 120B. The machine learning model 301 may analyze colors and shapes appearing in the frames 120A and 120B to identify the foot in the frames 120A and 120B. The device 104 may then generate bounding boxes 302 that contain the foot in the frames 120A and 120B. The bounding box 302A may bound the foot in the frame 120A. The bounding box 302B may bound the foot in the frame 120B. As a result, the bounding boxes 302 indicate or represent the boundaries of the foot in the frames 120. In some embodiments, the machine learning model 301 is separate from the machine learning model 124 that generates the predictions 125 for the frames 120. In certain embodiments, the machine learning model 301 is part of the machine learning model 124.

In some embodiments, the device 104 crops the frames 120 according to the bounding boxes 302 for the frames 120 to remove extraneous or irrelevant information from the frames 120. In the example of FIG. 3, the device 104 generates a cropped frame 304A by cropping the frame 120A according to the bounding box 302A of the foot in the frame 120A. Additionally, the device 104 generates the cropped frame 304B by cropping the frame 120B according to the bounding box 302B for the foot in the frame 120B. To generate the cropped frames 304, the device 104 may remove areas of the frames 120 that fall outside of the bounding boxes 302 for those frames 120. In this manner, the device 104 removes extraneous information from the frames 120 that may throw off or negatively impact subsequent predictions.

Figure 4:
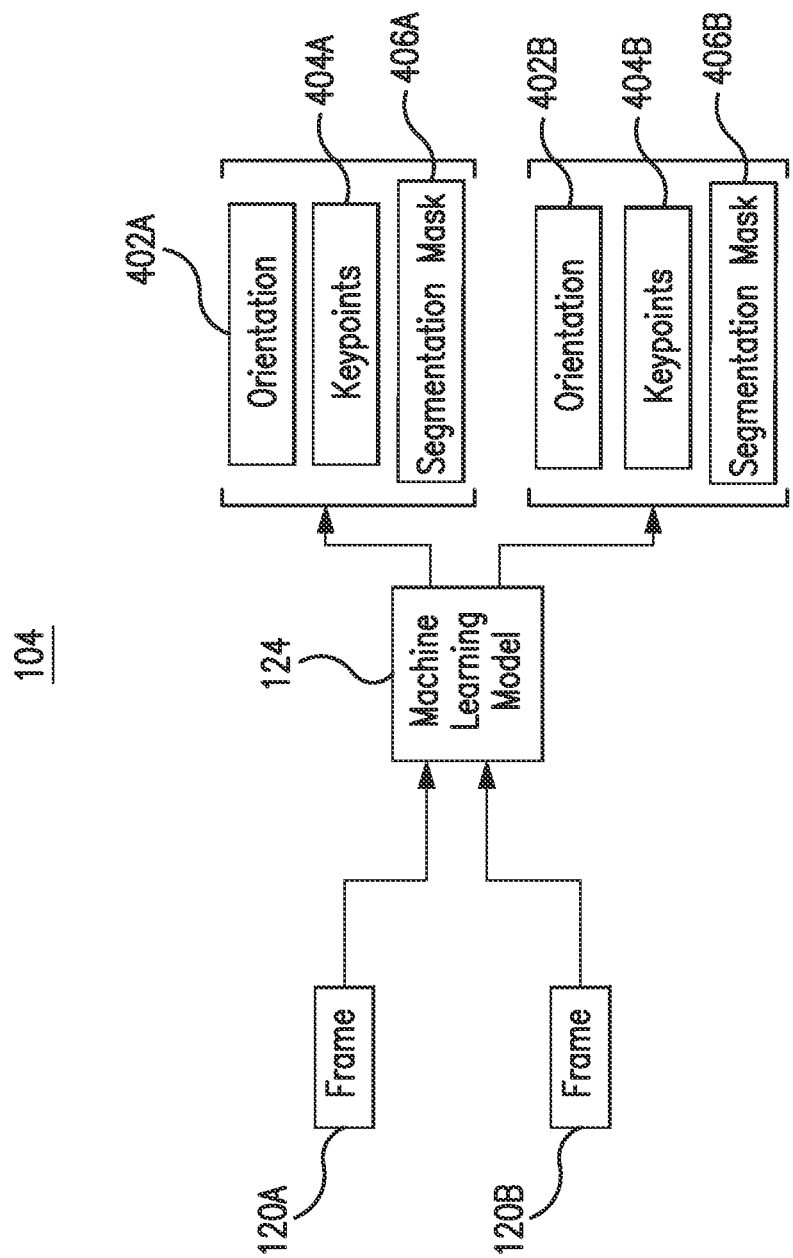
FIG. 4 illustrates an example device in the system of FIG. 1.

FIG. 4 illustrates an example device 104 in the system 100 of FIG. 1. As seen in FIG. 4, the device 104 uses the machine learning model to predict one or more aspects of a foot that appears in the frames 120. In some embodiments, the device 104 may apply the machine learning model 124 to the cropped frames 304 to predict the one or more aspects of the foot in the cropped frames 304. The device 104 then uses these predicted aspects of the foot to simulate the look and fit of a virtual shoe on the foot.

For example, the device 104 may apply the machine learning model 124 to the frames 120 to predict an orientation 402 of the foot in the frames 120. In the example of FIG. 4, the device 104 applies the machine learning model 124 to the frames 120A and 120B to predict the orientation 402A and 402B of the foot in the frames 120A and 120B. The orientations 402A and 402B may indicate an alignment or direction in which the foot in the frames 120A and 120B is pointing. For example, the device 104 may analyze portions of the foot in a frame 120 to determine if the foot is oriented at an angle relative to a particular axis in space. By analyzing a left and right boundary of the foot in the frame 120 (e.g., whether these boundaries tilt or slant leftwards, rightwards, upwards, or downwards), the device 104 may predict that the foot is turned towards the left or the right or tilted up or down in the frame 120.

As another example, the device 104 may apply the machine learning model 124 to the frames 120 to predict the locations of particular structures of the foot (e.g., the toes, the heel, or the ankle) in the frames 120. In the example of FIG. 4, the device 104 applies the machine learning model 124 to the frames 120A and 120B to predict keypoints 404A and 404B of structures on the foot in the frames 120A and 120B. The keypoints 404A and 404B may include coordinates of structures on the foot in the frames 120A and 120B. In an example, the device 104 may analyze the boundary of the foot to determine a size and shape of the foot. The size or shape of the foot may then be used to predict where certain structures of the foot (e.g., toes, ankle, and heel) are located.

As another example, the device 104 may apply the machine learning model 124 to the frames 120 to predict the locations of portions of the foot in the frames 120 that are occluded by other objects (e.g., a leg or apparel). As seen in FIG. 4, the device 104 applies the machine learning model 124 to the frames 120A and 120B to predict the segmentation masks 406A and 406B. The segmentation masks 406A and 406B indicate locations of portions of the foot that are occluded by other objects in the frames 120A and 120B. The device 104 may use the segmentation masks 406A and 406B to determine locations of portions of a shoe that will be occluded by other objects in the frames 120A and 120B. For example, the device 104 may analyze the boundary of the foot and the boundary of a leg in a frame 120 to determine points along the leg that will cover a portion of the foot. The device 104 then generates the coordinates along the foot that will be occluded by the leg.

Because these aspects of the foot are predicted individually for the frames 120, the predictions may vary significantly (e.g., due to drift and parallax) so as to cause jitter in the predictions across the frames 120. If these predictions were used to generate and superimpose the model of the shoe onto the foot in the frames 120, the model of the shoe would appear to jitter or move erratically across the frames 120, which degrades the user experience and reduces the accuracy of the simulated look and fit. In certain embodiments, the device 104 smooths these predictions, which reduces jitter between the frames 120.

Figure 5:
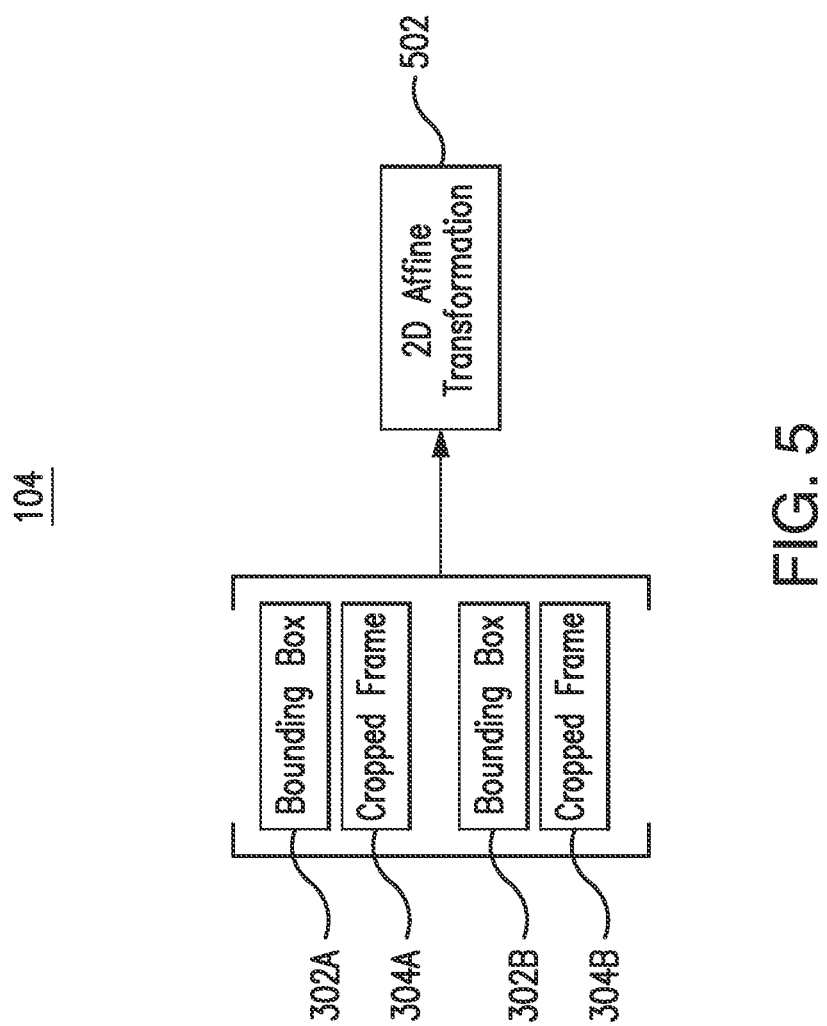
FIG. 5 illustrates an example device in the system of FIG. 1.

FIG. 5 illustrates an example device 104 in the system 100 of FIG. 1. As seen in FIG. 5, the device 104 uses the bounding boxes 302A and 302B to determine a 2D affine transformation 502. The device 104 may use any suitable number of bounding boxes 302 for any suitable number of frames 120 of the video 118 to generate the 2D affine transformation 502. Specifically, the device 104 may use the locations of the bounding boxes 302 in their respective frames 120 to estimate the 2D affine transformation 502. Effectively, the 2D affine transformation 502 characterizes the movement of the bounding box 302 across the frames 120. The movement of the bounding box 302 across the frames 120 may represent the movement of the foot in the frames 120. As a result, the device 104 may use the 2D affine transformation 502, to smooth prediction across frames 120.

In certain embodiments, the device 104 also uses the locations of some of the pixels in the cropped frames 304 to determine the 2D affine transformation 502. In the example of FIG. 5, the device 104 uses the locations of some of the pixels in the cropped frames 304A and 304B to determine the 2D affine transformation 502. The device 104 may track the movement of the content of one or more pixels in the cropped frames 304A and 304B. For example, if the content of a pixel moves to the right from frame 304A to frame 304B, the device 104 may determine that some movement of the foot occurred towards the right. The device 104 may use the determined movement of the content of the pixels between the cropped frames 304 along with the movement of the bounding boxes 302 in determining the 2D affine transformation 502 that characterizes the movement of the foot across the cropped frames 304 or the frames 120.

In some embodiments, the transformation involves a Lucas-Kanade optical flow tracker with a homography motion model. Suppose there is a 3D point v undergoing a rigid transformation (R, t) such that v'=Rv+t. If the point v lies on a plane (n, d) such that $n^T+d=0$, then the 2D projections of the point v are related by p'~Hp, wgere $$H = K\left(R - t\frac{n^T}{d}\right)K^{-1}.$$

K is the camera intrinsic matrix $$\begin{bmatrix} f_x & 0 & c_x \\ 0 & f_y & c_y \\ 0 & 0 & 1 \end{bmatrix}.$$

To simplify the computation, let $\tilde{p}=K^{-1}p$ so that $\tilde{p}'\sim(R-tu^T)\tilde{p}$, where u=n/d.

In a first approach, the Jacobian of the transformation may be calculated. The Jacobian with respect to each individual component is $r=(R(\omega)-tu^T)\tilde{p}$.

$$\frac{\partial \tilde{p}'}{\partial r} = \frac{1}{r_z}\begin{bmatrix} 1 & 0 & -p_x \\ 0 & 1 & -p_y \end{bmatrix}$$

$$\frac{\partial I}{\partial r} = \frac{\partial I}{\partial p}\frac{\partial p}{\partial \tilde{p}}\frac{\partial \tilde{p}}{\partial r} = \begin{bmatrix} \frac{f_x}{r_z}I_x(p') & \frac{f_y}{r_z}I_y(p') & -\frac{f_xp_xI_x(p')+f_yp_yI_y(p')}{r_z} \end{bmatrix}$$

$$\frac{\partial r}{\partial \omega} = \frac{\sin\|\omega\|}{\|\omega\|}\tilde{p}\omega^T - \left(\frac{\|\omega\|\cos\|\omega\|-\sin\|\omega\|}{\|\omega\|^3}[\tilde{p}]_x\omega\omega^T + \frac{\sin\|\omega\|}{\|\omega\|}[\tilde{p}]_x\right) +$$

$$\frac{\|\omega\|\sin\|\omega\|-2(1-\cos\|\omega\|)}{\|\omega\|^4}\omega\omega^T(\omega^T\tilde{p}) + \frac{1-\cos\|\omega\|}{\|\omega\|^2}[(\omega^T\tilde{p})I + \omega\tilde{p}^T]$$

These formulas may be ill-behaved when $\|\omega\|$ tends towards zero, as there may be many zero divisions. A Taylor expansion should be used instead when $\|\omega\|$ becomes small.

$$\frac{\partial r}{\partial t} = \begin{bmatrix} -u^T\tilde{p} & 0 & 0 \\ 0 & -u^T\tilde{p} & 0 \\ 0 & 0 & -u^T\tilde{p} \end{bmatrix}$$

By the chain rule:

$$J(p) = \frac{\partial I}{\partial(\omega,t)} = \frac{\partial I}{\partial r}\begin{bmatrix} \frac{\partial r}{\partial \omega} & \frac{\partial r}{\partial t} \end{bmatrix}$$

Following, the Lucas-Kanade optical flow framework, the incremental motion parameters across frames 120 are:

$$\Delta(\omega, t, u) =$$

$$\left[\sum_{p\in pixels} J(p)^T W(p) J(p)\right]^{-1}\left[\sum_{p\in pixels} J(p)^T W(p)(I_t(p) - I_s(W(p; \omega, t, u))\right]$$

where W(p) is a per-pixel weighting function taken from the segmentation probabilities, W (p; co, t, u) is the warping operator, and $I_s$ and $I_t$ denote the source and template frames respectively.

In an alternative approach, instead of using rotation and translation parameters, a homography H may be parameterized using eight parameters such that $$H = \begin{bmatrix} h_{00} & h_{01} & h_{02} \\ h_{10} & h_{11} & h_{12} \\ h_{21} & h_{22} & 1 \end{bmatrix}.$$

The Jacobian is then:

$$\frac{\partial I}{\partial H} = \frac{\partial I}{\partial p}\frac{\partial p}{\partial H} =$$

$$[I_x(p') \; I_y(p')]\frac{1}{h_{21}x + h_{22}y + 1}\begin{bmatrix} x & y & 1 & 0 & 0 & 0 & -x'x & -x'y \\ 0 & 0 & 0 & x & y & 1 & -y'x & -y'y \end{bmatrix}$$

where $p=(x, y, 1)^T$ and $p'=(x', y', 1)^T \sim Hp$. Computing the optical flow results in the homography transformation $\hat{H}$ between consecutive frames.

Alternatively, a 2D affine transformation model may be adopted to reduce the number of parameters and enhance the stability in transformation estimation. Let the affine transformation parameters be $$A = \begin{bmatrix} a_{00} & a_{01} & a_{02} \\ a_{10} & a_{11} & a_{12} \\ 0 & 0 & 1 \end{bmatrix},$$

then the Jacobian is given by the following formula:

$$\frac{\partial I}{\partial A} = [I_x(p') \; I_y(p')]\begin{bmatrix} x & y & 1 & 0 & 0 & 0 \\ 0 & 0 & 0 & x & y & 1 \end{bmatrix}$$

Where $$p' = (x', y', 1)^T = \begin{bmatrix} a_{00}x + a_{01}y + a_{02} \\ a_{10}x + a_{11}y + a_{12} \end{bmatrix}.$$

Figure 6:
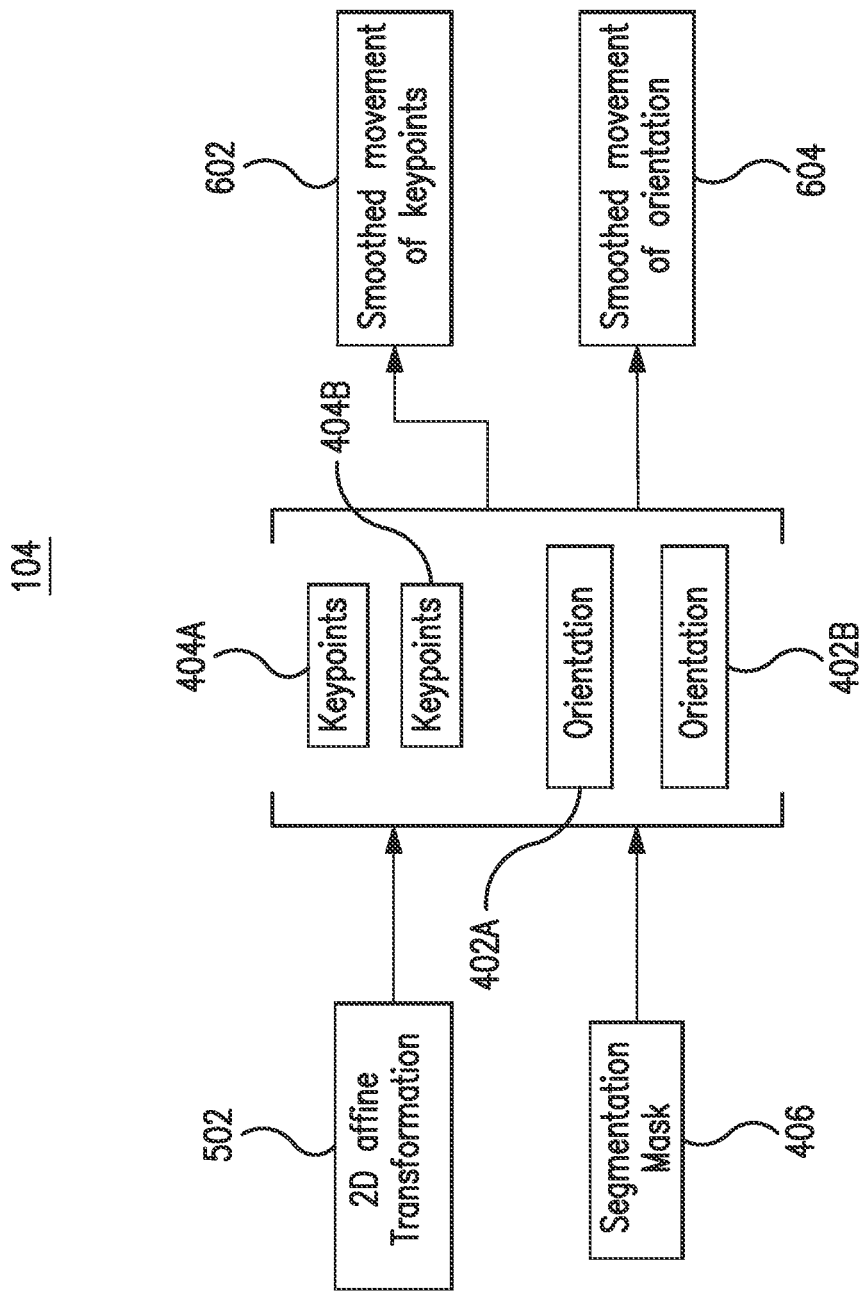
FIG. 6 illustrates an example device in the system of FIG. 1.

FIG. 6 illustrates an example device 104 in the system 100 of FIG. 1. As seen in FIG. 6, the device 104 uses the 2D affine transformation 502, which characterizes the movement of the bounding boxes 302 across the frames 120, to smooth the predictions generated by the machine learning model 124. By smoothing these predictions, the device 104 may improve the user experience and simulate a more accurate look and fit of the shoe on the foot.

The device 104 may use the 2D affine transformation 502 and one or more of the predicted segmentation masks 406 for the frames 120 to smooth the predictions for the locations of structures on the foot and the locations of portions of the foot that are occluded by other objects in the frames 120. In the example of FIG. 6, the device 104 uses the 2D affine transformation 502 to smooth the predicted locations. In some embodiments, the device 104 uses the segmentation masks 406 to determine which pixels in a particular frame 120 or cropped frame 304 do not need smoothing because those pixels are going to be occluded. For example, if a portion of a structure on the foot will be occluded, then the device 104 may not smooth the movement of that portion of the structure.

The device 104 may use the 2D affine transformation 502 to smooth the movement of structures on the foot across the frames 120. For example, the device 104 may perform mathematical transformations on the keypoints 404A and 404B based on the 2D affine transformation 502 to generate a smoothed movement 602 of keypoints of the foot. The smoothed movement 602 of keypoints may include updated coordinates of the locations of structures on the foot after the smoothing operation. The smoothed movement 602 of the keypoints may reduce jittery movement of the predicted locations of structures on the foot (e.g., the toes, the heel or the ankle).

The device 104 may also apply mathematical transformations on the predicted orientation 402 of the foot across frames (e.g., orientations 402A and 402B) using the 2D affine transformation 502 to generate a smoothed movement 604 of the orientation. The smoothed movement 604 of the orientation may provide a smoothed movement of the rotation or tilting of the foot. By using the smoothed movement 604 of the orientation, the device 104 may reduce the amount of jittery rotation or tilting of the foot in the frames 120.

In some embodiments, the Lucas-Kanade optical flow tracker is embedded in a rigid 3D Kalman tracking framework to smooth predictions over time (e.g., over several frames). A Kalman filter may be derived beginning with the states $(q_k, m_k, \omega_k, t_k)$. Let $\omega_k^r$ and $\omega_k^i$ be the real and imaginary parts of $\omega_k$. Let $q_k^r$ and $q_k^i$ be the real and imaginary parts of $q_k$.

$$\frac{\partial q_{k+1}}{\partial q_k} = \begin{bmatrix} \omega_k^r & -\omega_k^{iT} \\ \omega_k^i & \omega_k^r I_{3\times 3} + [\omega_k^i]_x \end{bmatrix}, \; \frac{\partial q_{k+1}}{\partial \omega_k} = \begin{bmatrix} q_k^r & -q_k^{iT} \\ q_k^i & qI_{3\times 3} - [q_k^i]_x \end{bmatrix}$$

$$F_k = \begin{bmatrix} \omega_k^r & -\omega_k^{iT} & 0_{1\times 3} & q_k^r & -q_k^{iT} & 0_{1\times 3} \\ \omega_k^i & \omega_k^r I_{3\times 3} + [\omega_k^i]_x & 0_{3\times 3} & q_k^i & qI_{3\times 3} - [q_k^i]_x & 0_{3\times 3} \\ 0_{3\times 4} & & I_{3\times 3} & 0_{3\times 4} & & I_{3\times 3} \\ 0_{4\times 4} & & 0_{4\times 3} & I_{4\times 4} & & 0_{4\times 3} \\ 0_{3\times 4} & & 0_{3\times 3} & 0_{3\times 4} & & I_{3\times 3} \end{bmatrix}$$

$$\tilde{c}_i = (x_i, y_i, 1)^T, \overline{\omega}_k = \frac{\omega_k}{|\omega_k|} = (\omega_0, \omega_1, \omega_2, \omega_3)^T$$

$$r_i = R(\omega_k)\tilde{c}_i - t_k u^T \tilde{c}_i$$

$$R(\omega_k)\tilde{c}_i = \begin{bmatrix} (\omega_0^2 + \omega_1^2 - \omega_2^2 - \omega_3^2)x_i + 2(\omega_1\omega_2 - \omega_0\omega_3)y_i + 2(\omega_0\omega_2 + \omega_1\omega_3) \\ 2(\omega_0\omega_3 + \omega_1\omega_2)x_i + (\omega_0^2 + \omega_2^2 - \omega_1^2 - \omega_3^2)y_i + 2(\omega_2\omega_3 - \omega_0\omega_1) \\ 2(\omega_1\omega_3 - \omega_0\omega_2)x_i + 2(\omega_0\omega_1 + \omega_2\omega_3)y_i + \omega_0^2 + \omega_3^2 - \omega_1^2 - \omega_2^2 \end{bmatrix}$$

-continued $$\frac{\partial r_i}{\partial \bar{\omega}_k} =$$

$$\begin{bmatrix} 2(\omega_0 x_i - \omega_3 y_i + \omega_2) & 2(\omega_1 x_i + \omega_2 y_i + \omega_3) & 2(-\omega_2 x_i + \omega_1 y_i + \omega_0) & 2(-\omega_3 x_i - \omega_0 y_i + \omega_1) \\ 2(\omega_3 x_i + \omega_0 y_i - \omega_1) & 2(\omega_2 x_i - \omega_1 y_i - \omega_0) & 2(\omega_1 x_i + \omega_2 y_i + \omega_3) & 2(\omega_0 x_i - \omega_3 y_i + \omega_2) \\ 2(-\omega_2 x_i + \omega_1 y_i + \omega_0) & 2(\omega_3 x_i + \omega_0 y_i - \omega_1) & 2(-\omega_0 x_i + \omega_3 y_i - \omega_2) & 2(\omega_1 x_i + \omega_2 y_i + \omega_3) \end{bmatrix}$$

$$\frac{\partial \bar{\omega}_k}{\partial \omega_k} = \frac{|\omega_k| I_{4 \times 4} - \omega_k \frac{\omega_k^T}{|\omega_k|}}{|\omega_k|^2} = \frac{I_{4 \times 4} - \bar{\omega}_k \bar{\omega}_k^T}{|\omega_k|}$$

$$\frac{\partial r_i}{\partial t_k} = -(u^T \tilde{c}_i) I_{3 \times 3}$$

Let $h_i = \Pi_K[r_i]$.

$$\frac{\partial h_i}{\partial r_i} = \begin{bmatrix} \frac{1}{r_i^z} & 0 & -\frac{r_i^x}{r_i^{z^2}} \\ 0 & \frac{1}{r_i^z} & -\frac{r_i^y}{r_i^{z^2}} \end{bmatrix}$$

Let $g_i = \Pi_K[R(q_k)s^i + m_k]$. $\partial q_k / \partial g_i$ may be derived analogous to $\partial \omega_k / \partial \omega h_i$. The expression for $\partial q_k / \partial g_i$ can be obtained by replacing $\omega_k$ with $q_k$, $t_k$ with $m_k$, $\tilde{c}_i$, with $s_i$, and $-(u^T \tilde{c}_i)$ with 1. The formula for $H_k$ then is:

$$H_k = \begin{bmatrix} I_{4 \times 4} & 0_{4 \times 3} & 0_{4 \times 4} & 0_{4 \times 3} \\ 0_{2 \times 4} & 0_{2 \times 3} & \frac{\partial h_1}{\partial \omega_k} & \frac{\partial h_1}{\partial t_k} \\ & & \vdots & \\ 0_{2 \times 4} & 0_{2 \times 3} & \frac{\partial h_N}{\partial \omega_k} & \frac{\partial h_N}{\partial t_k} \\ \frac{\partial g_1}{\partial q_k} & \frac{\partial g_1}{\partial m_k} & 0_{2 \times 4} & 0_{2 \times 3} \\ & \vdots & & \\ \frac{\partial g_k}{\partial q_k} & \frac{\partial g_k}{\partial m_k} & 0_{2 \times 4} & 0_{2 \times 3} \end{bmatrix}$$

In a first approach, the internal states of the extended Kalman filter are the 3D relative rotation parameters $q \in H$ and their velocities $\omega \in R^3$, together with the relative translation $m \in R^3$ and their velocities $t \in R^3$. Thus, the motion model is linear, given by the following:

$$q_{k+1} = \omega_k q_k + u_k$$

$$m_{k+1} = m_k + t_k + v_k$$

where $u_k$ and $v_k$ are Gaussian noise processes (e.g., $(u_k, v_k) \in N(0, Q)$). Additionally, a constant velocity model may be used for both linear and angular velocities, given by the following:

$$\omega_{k+1} = \omega_k + \pi_k$$

$$t_{k+1} = t_k + \rho_k$$

The observation quantities are the network predictions and the Lucas-Kanade tracker outputs. Let $\hat{\omega}_k$ and $\hat{t}_k$ be the incremental angular and translational motions estimated by the Lucas-Kanade tracker, described previously, and $\hat{q}_k$ and $\hat{p}_k$ be the orientation and keypoints predictions provided by the machine learning model 124. The observation model is as follows:

$$\begin{bmatrix} \hat{\omega}_k \\ \hat{t}_k \\ \hat{q}_k \end{bmatrix} = \begin{bmatrix} \omega_k \\ t_k \\ q_k \end{bmatrix} + \begin{bmatrix} \xi_k \\ \sigma_k \\ \zeta_k \end{bmatrix}$$

$$\hat{p}_k^i = \prod_K [R(q_k) s^i + m_k] + \gamma_k, \, i = 1, 2, \ldots, K$$

where $s^i$ is the i-th control point in 3D corresponding to the keypoint $\hat{p}_k^i$, $\Pi_K$ is the 2D perspective projection operator, and $(\xi_k, \sigma_k, \zeta_k, \gamma_k) \in N(0, R)$ are Gaussian noise processes.

In another embodiment, the Lucas-Kanade optical flow tracker is applied to obtain smoothed keypoints. The keypoints are then used to smooth orientations by solving a non-linear least squares problem. More specifically, let $\{p_i\}_{i=1}^K$ be the collection of smoothed keypoints, and let $\{q_i\}_{i=1}^K$ be their corresponding 3D coordinates on the shoe model. The 3D smoothed orientation $\hat{\theta}$ and position $\hat{t}$ may be estimated by solving the following:

$$\hat{\theta}, \hat{t} \leftarrow \text{argmin}_{(\theta, t)} \sum_{i=1}^K \left\| p_i - \prod_K [R(\theta) q_i + t] \right\|_2^2,$$

Where $\Pi_K$ is the perspective camera projection using intrinsics K. Optionally, $\hat{\theta}$ may be blended with the machine learning model predictions to avoid drifts in the long run.

In a second approach involving the homography transformation $\hat{H}$, the motion model for the 3D Kalman filter holds unchanged. The observation model is modified as follows: instead of observing $\hat{\omega}_k$, $\hat{H}$ is observed and the corresponding formula is replaced with $$\Pi_I((K^{-1}\hat{H}c_i) = \Pi_I[R(\omega_k) - t_k u^T)K^{-1} c_i] \xi_k = \Pi_I[R(\omega_k)\tilde{c}_i - t_k u^T \tilde{c}_i], \forall i$$

where $\{c_i\}_{i=1}^N$ is a collection of imaginary control points which can be sampled from an image grid ($\tilde{c}_i = K^{-1} c_i$) and $$\prod_I ((x, y)) = \frac{x}{y}$$

is the perspective projection operator. Optionally, u is tracked using a constant velocity model instead of approximating u with $[0,0,1]^T$.

Compared to the first approach, the second approach simplifies the computation of the Jacobian and can be potentially faster. The second approach also alleviates the burden of having to handle the ill-conditioning of the Jacobian and implementing Levernberg-Marquadt iterations.

Figure 7:
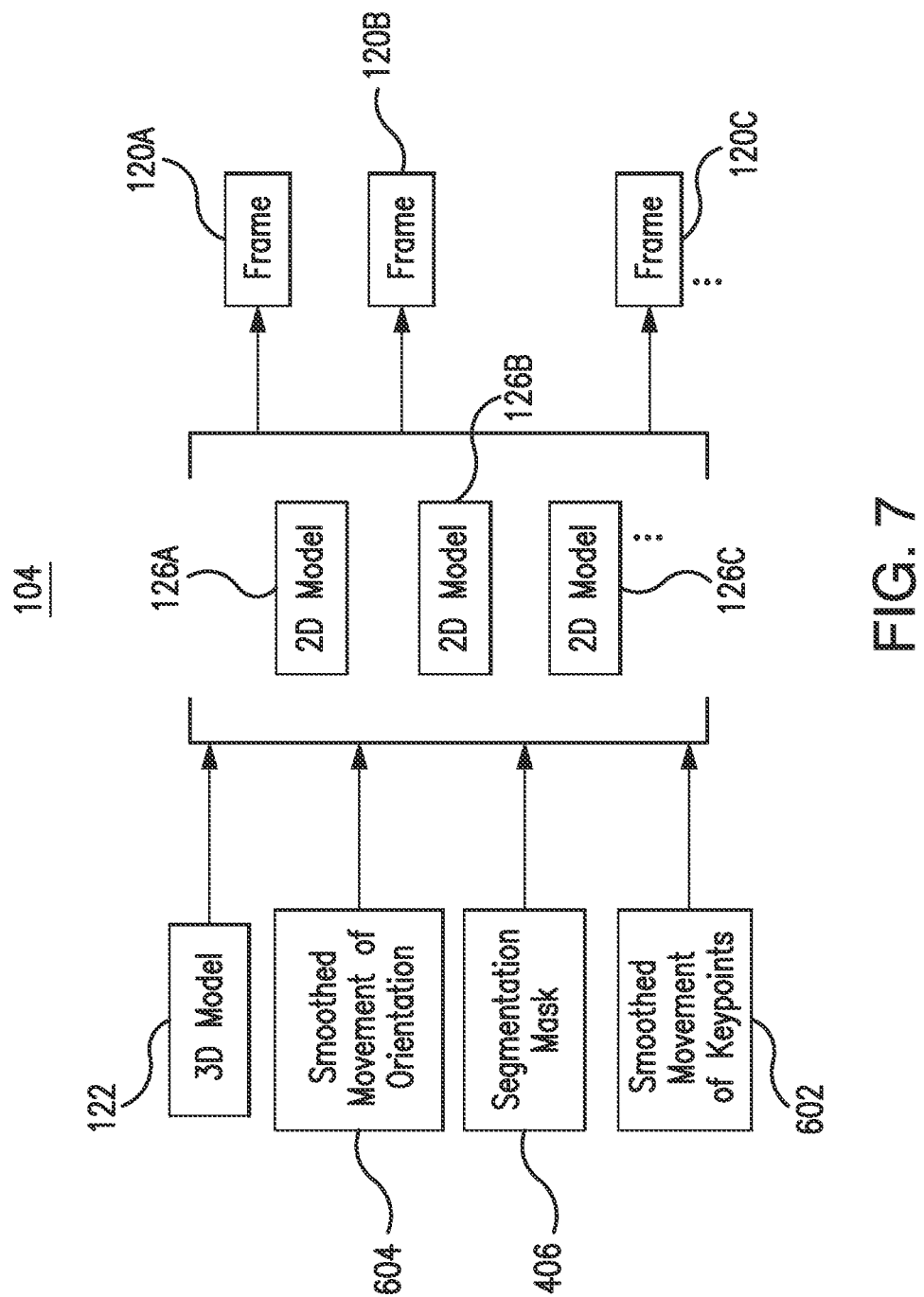
FIG. 7 illustrates an example device in the system of FIG. 1.

FIG. 7 illustrates an example device 104 in the system 100 of FIG. 1. As seen in FIG. 7, the device 104 uses the smoothed movement 602 of keypoints, the smoothed movement 604 of the orientation, and one or more of the predicted segmentation masks 406 to generate, for each frame 120 of the video 118, a 2D model 126 of a shoe using the 3D model 122 of the shoe. For example, for each frame 120, the device 104 may first use the smoothed movement 604 of the orientation to rotate the 3D model 122 of the shoe such that the 3D model 122 of the shoe aligns with the foot in the frame 120.

The device 104 may then use the updated coordinates for the locations of structures on the foot in the smoothed movement 602 of the keypoints to rescale or resize the 3D model 122 of the shoe so that the 3D model 122 of the shoe fits over the structures of the foot in the frame 120.

The device 104 may also use the coordinates for the portions of the foot that are occluded by other objects in the segmentation masks 406 to determine corresponding portions of the 3D model 122 of the shoe that will be occluded by objects in the frame 120. The device 104 may then remove, from the 3D model 122 of the shoe, these portions that will be occluded.

In some embodiments, if certain frames 120 are missing predictions (e.g., if the machine learning model 124 was unable to generate a prediction using the information in the frame 120), the smoothed movement 602 of keypoints and the smoothed movement 604 of the orientation may be used to fill in these missing predictions. For example, the device 104 may extrapolate a missing keypoint based on the smoothed movement 602 of the keypoints, and the device 104 may extrapolate a missing orientation based on the smoothed movement 604 of the orientation.

The device 104 then flattens the 3D model 122 to generate a 2D model 126 for the frame 120. The device 104 may repeat this process for each frame 120 to generate a 2D model 126 for each frame 120. In the example of FIG. 7, the device 104 generates 2D models 126A, 126B, and 126C for the frames 120A, 120B, and 120C, respectively. As a result, the 2D models 126 may be projections of the 3D model 122 to a 2D plane.

After the device 104 generates the 2D models 126, the device 104 superimposes the 2D models 126 onto their respective frames 120. For example, the device 104 may use the updated coordinates of the locations of structures on the foot in the smoothed movement 602 of keypoints to determine a location in the frame 120 where the respective 2D model 126 should be superimposed. The device 104 then superimposes the 2D model 126 onto the frame 120 to simulate the look and fit of the shoe on the foot in the frame 120. In the example of FIG. 7, the device 104 superimposes the 2D model 126A onto the frame 120A, the 2D model 126B onto the frame 120B, and the 2D model 126C onto the frame 120C.

Figure 8:
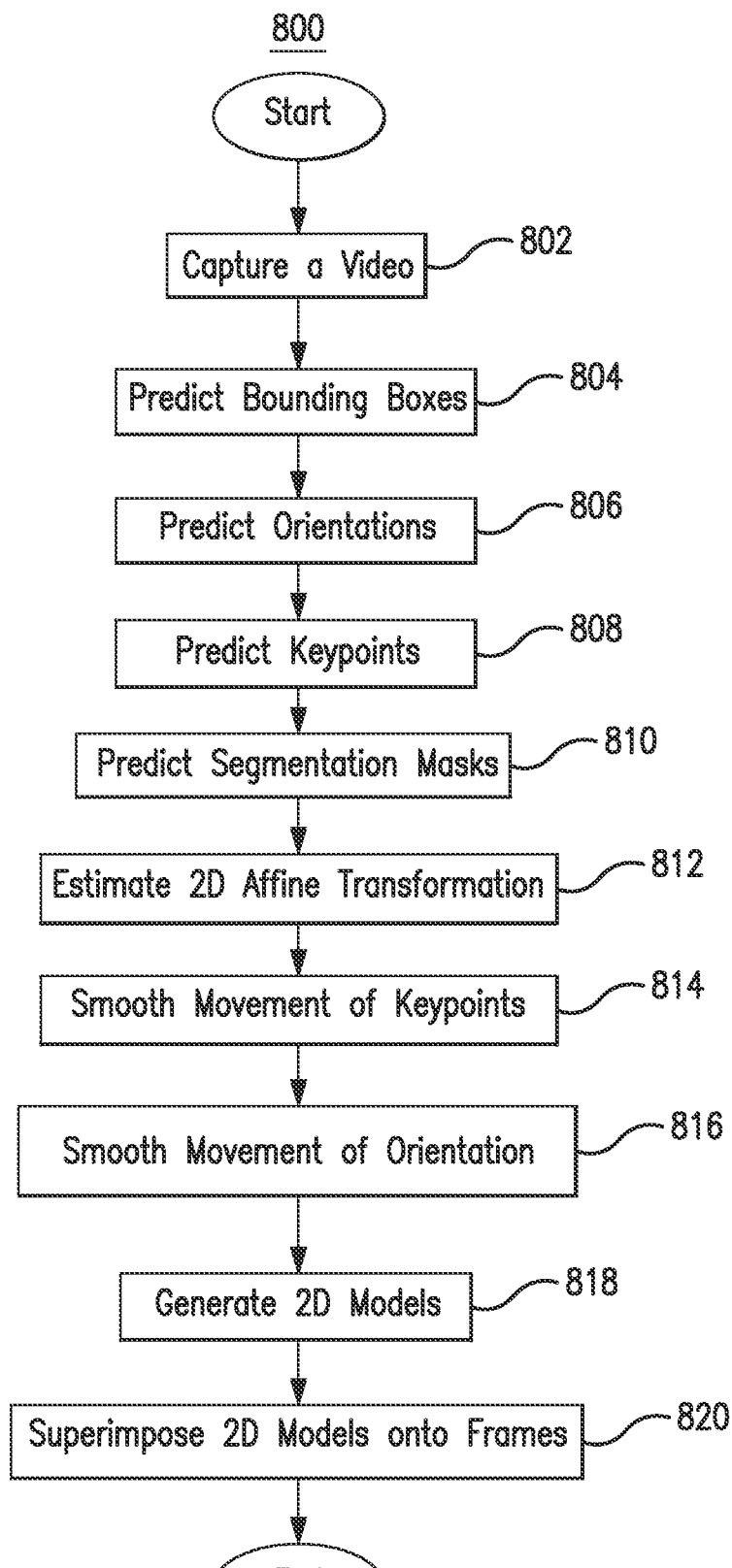
FIG. 8 is a flowchart of an example method performed in the system of FIG. 1.

FIG. 8 is a flowchart of an example method 800 performed in the system 100 of FIG. 1. In particular embodiments, the device 104 performs the method 800. By performing the method 800, the device 104 smooths predictions across frames 120 of a video 118, which reduces the amount of jitter in those predictions. As a result, the device 104 reduces the appearance of jittery motion in a displayed shoe model, when the shoe model is superimposed onto a user's 102 foot, to simulate the look and fit of the shoe on the foot.

In block 802, the device 104 captures a video 118. A user 102 may have directed a camera 114 of the device 104 towards the user's 102 foot. The device 104 then uses the camera 114 to capture the video 118 of the user's 102 foot.

The device 104 then predicts bounding boxes 302 for the frames 120 of the video 118 in block 804. For example, the device 104 may apply the machine learning model 301 to the frames 120 of the video 118 to predict or determine the boundary of the foot in the frames 120. The device 104 may analyze the color or shapes appearing in the frames 120 to identify or determine the boundary of the foot in the frames 120. The device 104 may then generate the bounding boxes 302 according to these determined boundaries of the foot. The bounding boxes 302 may bound the foot in the frames 120. In some embodiments, the device 104 further crops the frames 120 according to their respective bounding boxes 302. In this manner, the device 104 removes from the frames 120 extraneous information that may throw off subsequent predictions. For example, the device 104 may remove portions of the frames 120 that fall outside the bounding boxes 302.

In block 806, the device 104 predicts orientations 402 of the foot in the frames 120. For example, the device 104 may apply the machine learning model 124 to the frames 120 or the cropped frames 304 to predict an orientation 402 of the foot in the frames 120. The predicted orientations 402 may indicate an alignment or direction in which the foot in the frames 120 point. These predicted orientations 402 may later be used to align a model of the shoe with the foot in the frames 120.

In block 808, the device 104 predicts keypoints, which may include coordinates for the locations of certain structures on the foot (e.g., the toes, the heel or the ankle). The device 104 may apply the machine learning model 124 to the frames 120 or the cropped frames 304 to analyze the shape and structure of the foot in the frames 120. The machine learning model 124 may identify the structures of the foot and determine the location of these structures in the frames 120. The device 104 may use these predicted locations of certain structures on the foot to rescale or resize the model of the shoe to fit appropriately over the foot.

In block 810, the device 104 predicts segmentation masks 406, which include coordinates of locations of certain portions of the foot that are occluded by other objects in the frame (e.g., a leg or apparel). The device 104 may apply the machine learning model 124 to the frames 120 or the cropped frames 304 to determine the segmentation masks 406. For example, the machine learning model 124 may analyze the foot in the frames 120 to determine portions of the foot that are occluded by other objects in the frame 120. The machine learning model 124 then determines the locations of these portions to generate the segmentation masks 406.

In block 812, the device 104 estimates the 2D affine transformation 502 using the bounding boxes 302 predicted for the frames 120. For example, the device 104 may use the locations of these bounding boxes 302 across the frames 120 to estimate the 2D affine transformation 502. As a result the 2D affine transformation 502 characterizes the movement of these bounding boxes 302 across the frames 120, which may represent the movement of the foot across the frames 120. The 2D affine transformation 502 may then be used to smooth the movement of the other predictions across the frames 120. In some embodiments, the device 104 also tracks the movement of the content in a pixel across the frames 120 or the cropped frames 304 to estimate the 2D affine transformation 502. The device 104 may consider how the content of a pixel moves to other pixels across the frames 120 or the cropped frames 304 in further characterizing the movement of the foot across the frames 120.

In block 814, the device 104 smooths the movement of the predicted keypoints, which include the locations of certain structures of the foot, across the frames 120. For example, the device 104 may use the 2D affine transformation 502 to smooth the movement of the predicted locations of structures of the foot across the frames 120. In block 816, the device 104 smooths the movement of the orientation 402 across the frames 120. The device 104 may use the 2D affine transformation 502 to smooth the movement of the orientation 402 across the frames 120.

In block 818, the device 104 generates 2D models 126 of the shoe. For example, the device 104 may retrieve a 3D model 122 of the shoe from the database 108. The device 104 may then rotate the 3D model 122 of the shoe according to the smoothed movement 604 of the orientation so that the 3D model 122 of the shoe aligns with the orientation of the foot in the frame 120. The device 104 may then rescale or resize the 3D model 122 of the shoe using the smoothed movement 602 of the locations of structures on the foot in the frame 120 so that the 3D model 122 of the shoe fits over the foot in the frame 120. The device 104 may then use the segmentation mask 406 for the frame 120 to determine the locations of portions of the 3D model 122 of the shoe corresponding to portions of the foot that will be occluded by other objects in the frame 120. The device 104 then removes from the 3D model 122 of the shoe these corresponding portions. The device 104 then flattens the 3D model 122 of the shoe to generate the 2D model 126 of the shoe for the frame 120. The device 104 may repeat this process for every frame 120 to generate a 2D model 126 for each frame 120.

In block 820, the device 104 superimposes the 2D models 126 of the shoe onto their respective frames 120. For example, the device 104 may use the predicted locations of structures of the foot in each frame 120 to determine a position of the 2D model 126 of the shoe for that frame 120. The device 104 then superimposes the 2D model 126 of the shoe onto that location in the frame 120 to simulate the look and fit of the shoe on the foot in that frame 120. If the user moves the foot or the camera, the foot in the frames 120 will move to different locations in the frames 120. This movement will be considered when smoothing the predictions across the frames. As a result, the 2D models 126 will also move to be appropriately superimposed onto the foot in the frames 120. By superimposing the 2D models 126 onto their respective frames 120, the device 104 simulates the look and fit of the shoe on the foot in the video 118.

Figure 9:
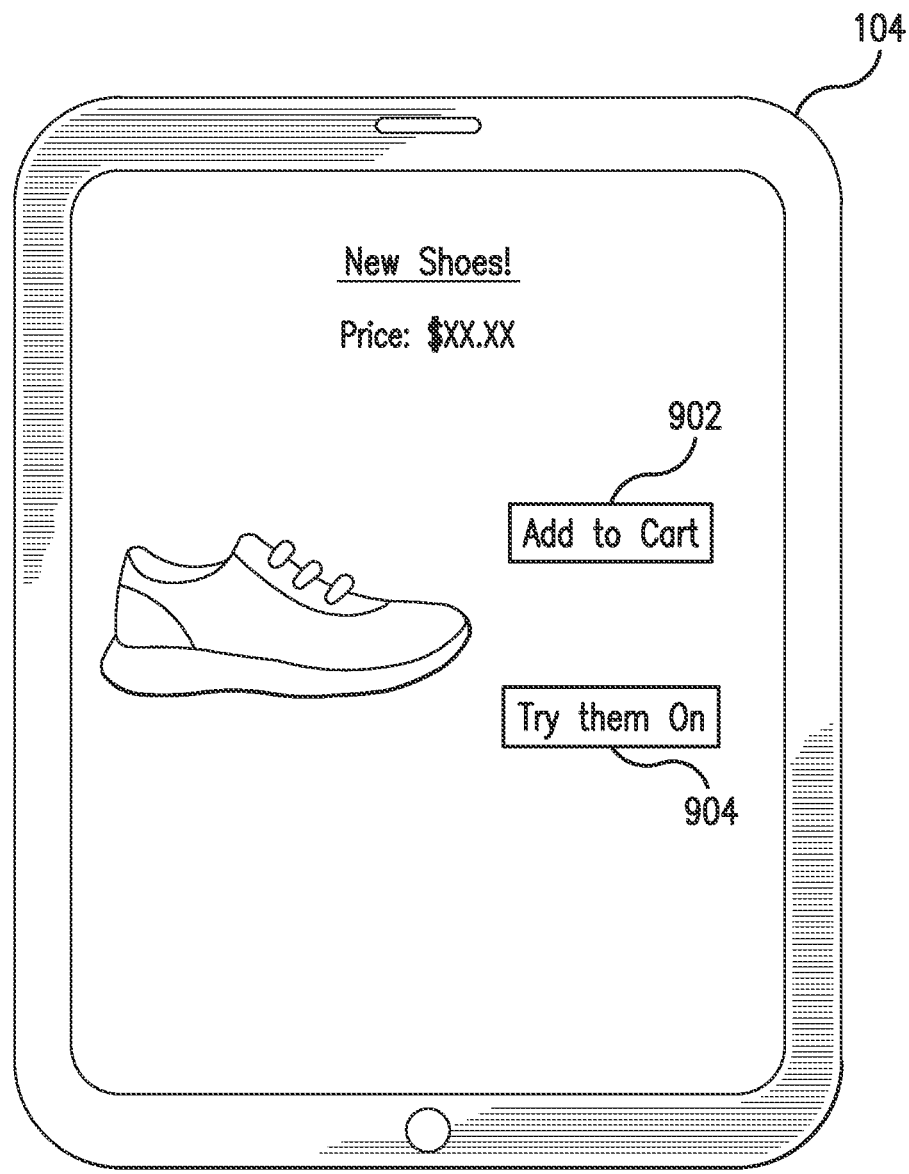
FIG. 9 illustrates an example device in the system of FIG. 1.

FIG. 9 illustrates an example device 104 in the system 100 of FIG. 1. As seen in FIG. 9, the device 104 is being used to shop for shoes online. The device 104 shows a product listing for a shoe. The listing includes an image of the shoe along with a price for the shoe. Additionally, the device 104 presents a button 902 and a button 904. If the button 902 is activated or pressed by a user 102, the device 104 communicates a message requesting that the shoe be added to a virtual shopping cart of the user 102. The user 102 may then checkout and purchase the shoe.

If the user 102 activates or presses the button 904, the device 104 may begin the virtual shoe try-on process to simulate the look and fit of the shoe on the user's 102 foot. By providing this feature, the device 104 allows the user 102 to see how the shoe looks on the user's 102 foot before the user 102 commits to purchasing the shoe. In this manner, the device 104 reduces the likelihood that the user 102 will be dissatisfied with the shoe purchase and the likelihood that the user 102 will return the shoe. As a result, the device 104 improves the satisfaction of the user 102 and conserves shipping resources, such as packaging materials and fuel, in particular embodiments.

Figure 10:
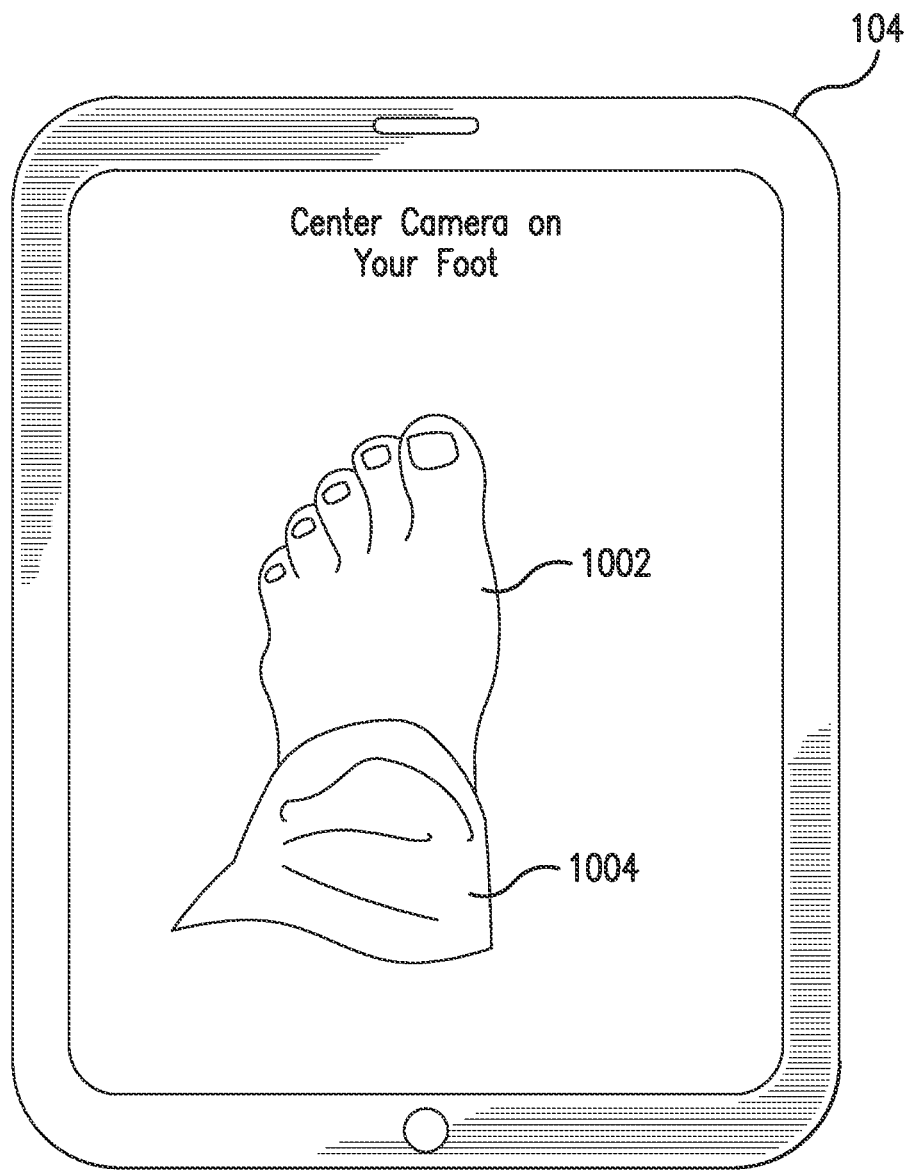
FIG. 10 illustrates an example device in the system of FIG. 1.

FIG. 10 illustrates an example device 104 in the system 100 of FIG. 1. As seen in FIG. 10, the device 104 requests that the user 102 take a picture of the user's 102 foot after the user 102 presses or activates the button 904 to begin the virtual shoe try-on process. The image captured by the user 102 includes the user's foot 1002 and a portion of the user's leg 1004. Additionally, the perspective of the user's foot 1002 shown in the image is a top-down perspective of the foot 1002.

In some embodiments, after the user 102 presses or activates the button 904 to begin the virtual shoe try-on feature, the device 104 communicates a message to the database 108 to retrieve a 3D model 122 of the shoe in the product listing. The database 108 retrieves the 3D model 122 of the shoe and communicates the 3D model 122 of the shoe to the device 104. The device 104 then uses the 3D model 122 of the shoe for the virtual try-on process.

Figure 11:
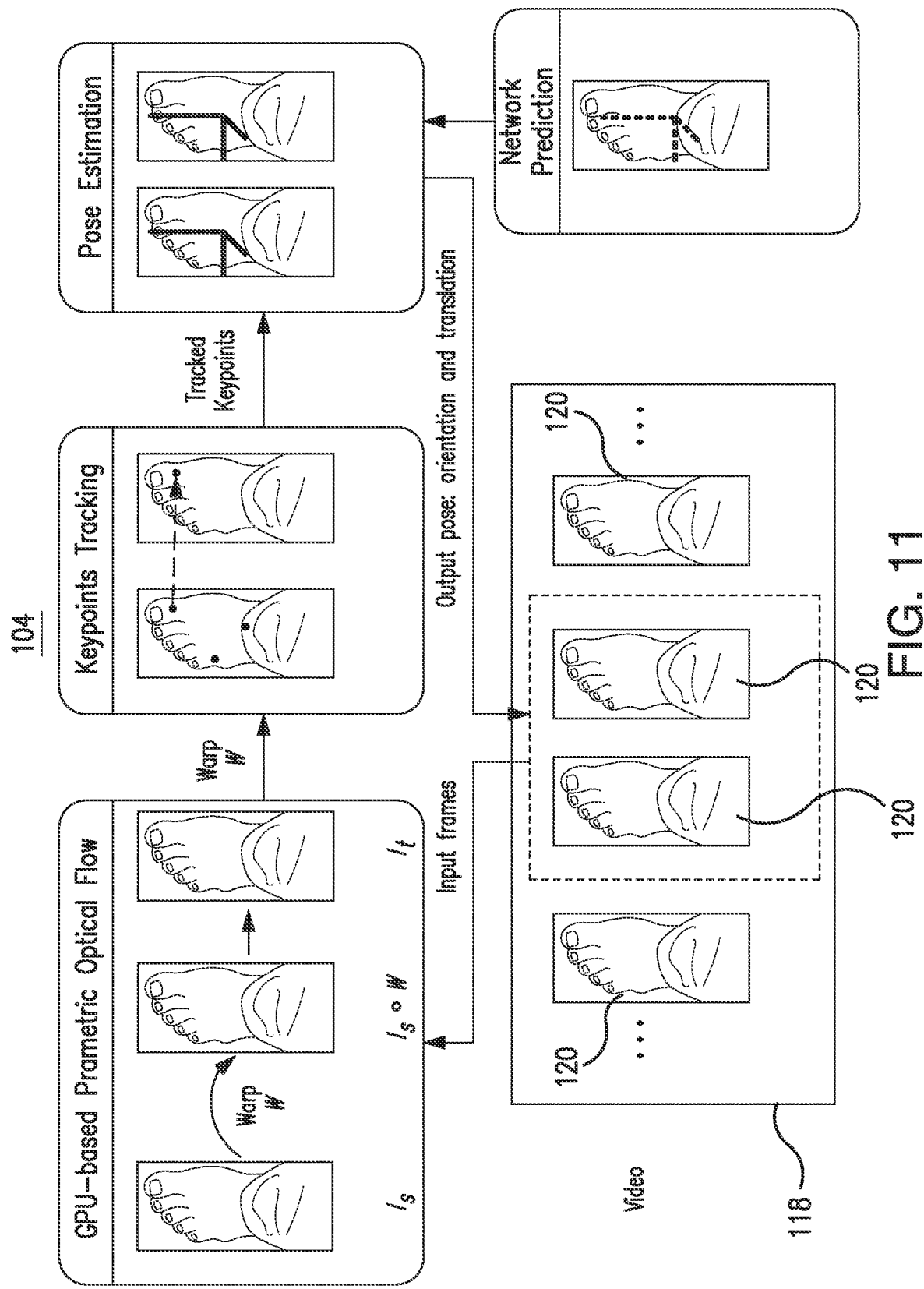
FIG. 11 illustrates an example device in the system of FIG. 1.

FIG. 11 illustrates an example device 104 in the system 100 of FIG. 1. As seen in FIG. 11, the device 104 receives a video 118 of a foot. The video 118 includes multiple frames 120, which are images of the foot. In some embodiments, the device 104 determines a bounding box for the foot for each frame 120 of the video 118. The device 104 may also crop each frame 120 according to the bounding box.

The device 104 then performs GPU-based parametric optical flow using the locations of the respective bounding boxes across sequential frames 120 in the video 118. This process generates a 2D affine transformation that characterizes the movement of the bounding box across the frames 120. In the example of FIG. 11, the 2D affine transformation is represented by a warp (W). The device 104 applies the warp (W) to a source frame ($I_s$). In some embodiments, the warp (W) minimizes the differences (e.g., the parametric losses) between the transformed or warped source frame ($I_s \circ W$) and a template frame ($I_t$).

By applying the 2D affine transformation to the frame, the device 104 applies the 2D affine transformation to various predictions for that frame. As seen in FIG. 11, the device 104 applies the warp (W) to the locations of keypoints on the foot, which are the locations of certain structures on the foot (e.g., the toes, the heel, or the ankle). By applying the 2D affine transformation to the structure locations, the device 104 smooths the movement of these locations across the frames 120. Additionally, the device 104 may apply the 2D affine transformation to an orientation or estimated pose of the foot in the frames. In this manner, the device 104 smooths the predictions for the location and orientation of the foot across the frames 120, which reduces jitter in these predictions across the frames 120. As a result, when the device 104 generates and superimposes the 2D models 126 of the foot onto their respective frames 120, the user may see less movement or jitter in the placement of the 2D models 126 of the shoe in the frames 120.

Figure 12:
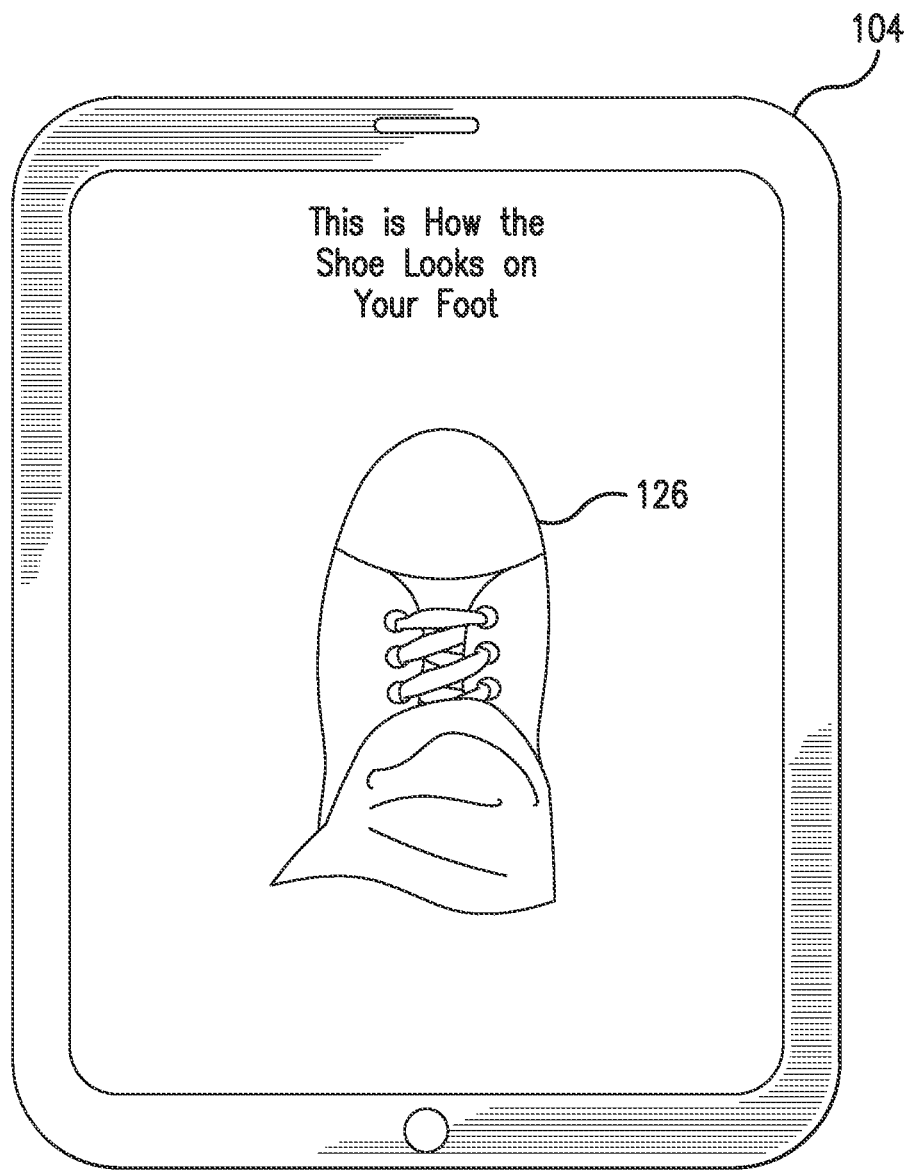
FIG. 12 illustrates an example device in the system of FIG. 1.

FIG. 12 illustrates an example device 104 in the system 100 of FIG. 1. As seen in FIG. 12, the device 104 has processed the image of the user's foot 1002 and the 3D model 122 of the shoe. The device 104 has generated a 2D model 126 of the shoe and superimposed the 2D model 126 of the shoe onto the image of the user's 102 foot. The device 104 then presents an image showing the 2D model 126 of the shoe superimposed onto the user's 102 foot. When the user views the device 104, the user sees how the shoe looks and fits on the user's 102 foot. The user 102 may then evaluate whether the user 102 wants to purchase the shoe.

In summary, a device 104 implements a process for smoothing predictions across frames 120 of a video 118 using the predictions generated for other frames 120 of the video 118. The smoothing process begins by tracking the location of a bounding box 302 for a foot across frames 120 of the video 118. A 2D affine transformation 502 that characterizes the movement of the bounding box 302 across frames is generated. The 2D affine transformation 502 is then used to smooth the predictions. For example, an extended Kalman filter for 3D rigid tracking may use the predicted orientation of the foot and the 2D affine transformation 502 as motion cues. The locations of key structures on the foot and the orientation of the foot across frames 120 are then smoothed by the Kalman filter predictions. The 2D model 126 of the shoe is then generated from the 3D model 122 of the shoe using these smoothed predictions. In this manner, the user 102 observes a more accurate simulation of the look and fit of the shoe on the user's 102 foot, in certain embodiments The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosures describes a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A method for fitting a virtual shoe onto a foot, the method comprising:
    capturing a video comprising a sequence of frames of a foot;
    predicting a first location of a bounding box for the foot in a first frame of the sequence of frames and a second location of the bounding box for the foot in a second frame of the sequence of frames;
    predicting a first location of a structure of the foot in the first frame and a second location of the structure in the second frame;
    estimating, based at least in part on the first location of the bounding box in the first frame, the second location of the bounding box in the second frame, and a movement of content in a pixel of the first frame to the second frame, a two-dimensional (2D) affine transformation that characterizes a movement of the foot in the sequence of frames;
    smoothing, based at least in part on the 2D affine transformation, a movement of the structure from the first location of the structure to the second location of the structure; and
    superimposing a model of a shoe onto the foot in the sequence of frames based at least in part on the smoothed movement of the structure from the first location of the structure to the second location of the structure.

2. The method of claim 1, further comprising cropping the first frame based on the first location of the bounding box.

3. The method of claim 1, further comprising:
    predicting a first orientation of the foot in the first frame and a second orientation of the foot in the second frame; and
    smoothing, based at least in part on the 2D affine transformation, a movement of the first orientation to the second orientation, wherein the model of the shoe is generated based at least in part on the smoothed movement of the first orientation to the second orientation.

4. The method of claim 1, further comprising predicting, based at least in part on the smoothed movement of the structure from the first location of the structure to the second location of the structure, a third location of the foot in a third frame of the sequence of frames in response to determining that a prediction for the third location is missing.

5. A method comprising:
    estimating, based at least in part on a first location of a bounding box for a foot in a first frame of a sequence of frames and a second location of the bounding box in a second frame of the sequence of frames, a smoothing transformation that characterizes a movement of the foot in the sequence of frames;
    smoothing, based at least in part on the smoothing transformation, a movement of a structure of the foot from a first location of the structure in the first frame to a second location of the structure in the second frame; and
    superimposing a model of a shoe onto the foot in the sequence of frames based at least in part on the smoothed movement of the structure from the first location of the structure to the second location of the structure.

6. The method of claim 5, further comprising cropping the first frame based on the first location of the bounding box.

7. The method of claim 5, further comprising:
    predicting a first orientation of the foot in the first frame and a second orientation of the foot in the second frame; and
    smoothing, based at least in part on the smoothing transformation, a movement of the first orientation to the second orientation.

8. The method of claim 7, further comprising:
    rotating a three-dimensional (3D) model of the shoe based on the smoothed movement of the first orientation to the second orientation; and
    generating the model of the shoe based on the 3D model of the shoe after rotating the 3D model of the shoe.

9. The method of claim 5, wherein superimposing the model of the shoe onto the foot in the sequence of frames comprises moving the model of the shoe to different locations in the sequence of frames based at least in part on the smoothed movement of the structure from the first location of the structure to the second location of the structure.

10. The method of claim 5, further comprising computing a Jacobian of the smoothing transformation, wherein smoothing the movement of the structure is based at least in part on the Jacobian of the smoothing transformation.

11. The method of claim 10, wherein computing the Jacobian of the smoothing transformation comprises using a Taylor expansion to determine changes to the smoothing transformation.

12. The method of claim 5, further comprising predicting, based at least in part on the smoothed movement of the structure from the first location of the structure to the second location of the structure, a third location of the foot in a third frame of the sequence of frames in response to determining that a prediction for the third location is missing.

13. An apparatus comprising:
a memory; and
a processor communicatively coupled to the memory, the processor configured to:
estimate, based at least in part on a first location of a bounding box for a foot in a first frame of a sequence of frames and a second location of the bounding box in a second frame of the sequence of frames, a smoothing transformation that characterizes a movement of the foot in the sequence of frames;
smooth, based at least in part on the smoothing transformation, a movement of a structure of the foot from a first location of the structure in the first frame to a second location of the structure in the second frame; and
superimpose a model of a shoe onto the foot in the sequence of frames based at least in part on the smoothed movement of the structure from the first location of the structure to the second location of the structure.

14. The apparatus of claim 13, the processor further configured to crop the first frame based on the first location of the bounding box.

15. The apparatus of claim 13, the processor further configured to:
predict a first orientation of the foot in the first frame and a second orientation of the foot in the second frame; and
smooth, based at least in part on the smoothing transformation, a movement of the first orientation to the second orientation.

16. The apparatus of claim 15, the processor further configured to:
rotate a three-dimensional (3D) model of the shoe based on the smoothed movement of the first orientation to the second orientation; and
generate the model of the shoe based on the 3D model of the shoe after rotating the 3D model of the shoe.

17. The apparatus of claim 13, wherein superimposing the model of the shoe onto the foot in the sequence of frames comprises moving the model of the shoe to different locations in the sequence of frames based at least in part on the smoothed movement of the structure from the first location of the structure to the second location of the structure.

18. The apparatus of claim 13, the processor further configured to compute a Jacobian of the smoothing transformation, wherein smoothing the movement of the structure is based at least in part on the Jacobian of the smoothing transformation.

19. The apparatus of claim 18, wherein computing the Jacobian of the smoothing transformation comprises using a Taylor expansion to determine changes to the smoothing transformation.

20. The apparatus of claim 13, the processor further configured to predict, based at least in part on the smoothed movement of the structure from the first location of the structure to the second location of the structure, a third location of the foot in a third frame of the sequence of frames in response to determining that a prediction for the third location is missing.

* * * * *